United States Patent
Lung

(10) Patent No.: US 8,336,468 B2
(45) Date of Patent: Dec. 25, 2012

(54) TRANSPORT LOCK FOR FURROW OPENER ASSEMBLIES

(75) Inventor: Devin Lung, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 256 days.

(21) Appl. No.: 12/790,094

(22) Filed: May 28, 2010

(65) Prior Publication Data

US 2011/0290165 A1   Dec. 1, 2011

(51) Int. Cl.
  *A01B 61/04* (2006.01)
  *A01B 63/16* (2006.01)
  *A01B 61/00* (2006.01)
  *A01C 5/00* (2006.01)
  *A01C 7/18* (2006.01)

(52) U.S. Cl. .......... 111/151; 111/156; 111/194; 111/60; 172/260.5; 172/263; 172/269; 172/414; 172/416; 172/417; 172/418; 172/635; 172/776

(58) Field of Classification Search ............... 111/120, 111/121, 123–125, 129, 149, 157, 163–170, 111/190–196, 156, 187, 188, 176, 64, 73, 111/52, 59, 60, 69, 151; 172/260.5, 261–271, 172/395, 414–420, 613, 634–639, 776
See application file for complete search history.

(56) References Cited

U.S. PATENT DOCUMENTS

| 5,396,851 A | 3/1995 | Beaujot |
| 7,412,933 B2 | 8/2008 | Bourgault et al. |

*Primary Examiner* — Christopher J. Novosad
(74) *Attorney, Agent, or Firm* — Frost Brown Todd LLC

(57) ABSTRACT

A furrow opener apparatus attachable to an implement has a trailing arm with a packer wheel at the rear end, and a furrow opener attached forward of the packer wheel. An actuator moves the trailing arm between a lowered operating position and a raised transport position. A latch mechanism engages the implement frame and the trailing arm when the actuator is operated to move the trailing arm to the transport position, preventing the trailing arm from moving downward. A release mechanism moves the latch mechanism to an unlatched position when the actuator is operated to move the trailing arm from the raised transport position to the lowered operating position, allowing the trailing arm to move down from the transport position.

15 Claims, 9 Drawing Sheets

TRANSPORT LOCK FOR FURROW OPENER ASSEMBLIES

This invention is in the field of agricultural implements and in particular a transport lock for furrow opener assemblies.

BACKGROUND

Agricultural seeders are used to place seed and fertilizer in the soil to plant a crop. It is necessary to place the seed at a substantially consistent depth beneath the surface of the soil. Opener arms of various configurations typically extend downward from the seeder frame with a seed furrow opener mounted to the opener arm and adapted to engage the soil to make a seed furrow into which the seed is deposited. Typically, the furrow opener pushes soil to one or both sides and seed is deposited close behind the furrow opener so that the pushed aside soil can then fall back in on top of the seed. A packer wheel is typically provided following the seed furrow opener and oriented to roll over the seed furrow to pack the soil that has fallen back over the seed and encourage seed germination.

In order to maintain a consistent seed depth, agricultural seeding implements have been designed to provide an individual independently movable furrow opener assembly for each furrow being seeded. A popular furrow opener assembly comprises a trailing arm pivotally attached at a front end thereof to the seeder such that the arm extends generally rearward and downward from the frame and can pivot up and down with respect to the seeder frame. A packer wheel is rotatably attached to support the rear end of the trailing arm. A seed furrow opener is attached to the trailing arm ahead of the packer wheel such that the vertical position of the bottom of the seed furrow opener with respect to the bottom of the packer wheel can be fixed at a desired location to set the depth of the seed furrow. A bias element is provided to push or pull downward on the trailing arm to engage the seed furrow opener in the soil and force the packer wheel against the ground.

The furrow opener assemblies are spaced laterally along the width of the implement by mounting the front ends of the trailing arms to lateral frame members of the implement.

The packer wheel pushes down the soil of the seed in the seed furrow and the bottom of the packer wheel corresponds to the soil surface. The depth of the seed furrow is substantially determined by the vertical distance that the bottom end of the seed furrow opener extends below the bottom of the packer wheel. Such a trailing arm seed furrow opener assembly is disclosed for example in U.S. Pat. No. 7,412,933 to Bourgault et al., particularly in FIG. 1 thereof, and in U.S. Pat. No. 5,396,851 to Beaujot.

The bias element used to apply the downward bias force is typically provided by a hydraulic cylinder and it is convenient to also use this same hydraulic cylinder to raise and lower the furrow opener assemblies. In an operating mode, pressurized hydraulic fluid is directed into an operating end of the hydraulic cylinder to move the hydraulic cylinder in a direction such that same forces the furrow opener assembly downward to an operating position where same engages the ground, and in a transport mode, pressurized hydraulic fluid is directed into an opposite transport end of the hydraulic cylinder to move the hydraulic cylinder in the opposite direction and raise the furrow opener assembly to a raised transport position where the packer wheel and furrow opener are above the ground. In some configurations the hydraulic cylinder extends in the operating mode and retracts in the transport mode, and in other configurations the opposite occurs.

When in the operating mode, pressurized hydraulic fluid is constantly being directed into the operating end of the hydraulic cylinder to maintain a substantially constant bias force on the assembly. The source of pressurized hydraulic fluid is operative to maintain a substantially constant pressure of fluid in the cylinder, and also to allow fluid to move into and out of the cylinder to allow the furrow opener assembly to move up and down to follow the terrain.

In the transport mode however, pressurized hydraulic fluid enters the transport end of the hydraulic cylinder until the furrow opener assembly is fully raised, and the hydraulic cylinder is fully extended or retracted as the case may be. Once the fully raised position is reached, a valve is typically operative to close the connection to the source of pressurized hydraulic fluid, such that fluid in the hydraulic cylinder is blocked from exiting the cylinder and the weight of the assembly is supported by the non-compressible fluid in the cylinder.

A problem occurs with age and wear of the hydraulic seals in the hydraulic cylinder as hydraulic fluid can leak past the seals, either internally or externally, such that the furrow opener assemblies creep down. The operator can operate the valve to direct pressurized hydraulic fluid into the transport end of the hydraulic cylinder periodically to raise any partially lowered assemblies to the fully raised transport position. If this downward creep goes unnoticed, it can lead to equipment damage during transport, or damage to adjacent vehicles while traveling on public roads. Because of the typical parallel configuration of the multiple opener assemblies on a single toolbar, a single failed seal causing a leak on a single cylinder could result in the failure of all of the assemblies to be held in the transport position.

Agricultural equipment manufacturers have been working to minimize the leak down of the opener assemblies with the addition of multiple backup isolation valves in an attempt to extend transport periods with limited success.

SUMMARY OF THE INVENTION

It is an object of the present invention to provide a transport lock apparatus for furrow opener assemblies that overcomes problems in the prior art.

In many common agricultural implements it is known to raise wings up to a transport position and then pin or latch same either manually or automatically to prevent them from falling down if a hydraulic line or seal fails. This has been required as a safety feature since the wings are very large and are high in the air. Should a hydraulic line or seal fail, a falling wing would cause great injury to any person standing in its path, and as well cause considerable damage to the wing itself by contact with the ground, especially if moving at high transport speeds at the time.

Since each individual furrow opener assembly is relatively small and is raised only a short distance above the ground, the same safety issues do not arise as are present with implement wings. The risk of serious injury from a falling furrow opener assembly is much less, and so it has not been seen as necessary to pin or latch them in the transport position. In addition, on a typical implement there will be dozens of furrow opener assemblies and so locking them into transport position could be time consuming, and/or require a complex mechanism.

In a first embodiment the present invention provides a furrow opener apparatus adapted for attachment to a frame member of an agricultural seeding implement. The apparatus comprises a trailing arm adapted to be pivotally attached at a front end thereof to the frame member about an arm pivot axis oriented substantially horizontally and perpendicular to an operating travel direction of the implement, and the trailing arm extending rearward from the front end thereof. A packer wheel is rotatably attached to a rear end of the trailing arm, and a furrow opener is attached to the trailing arm forward of the packer wheel. An actuator is operative to selectively move the trailing arm about the arm pivot axis from a lowered operating position to a raised transport position, and from the raised transport position to the lowered operating position. A latch mechanism is operative to engage the frame member and the trailing arm when the trailing arm is moved to the transport position, such that the trailing arm is prevented from moving downward when the latch mechanism is in a latched position. A release mechanism is operative to move the latch mechanism to an unlatched position, where the frame member and trailing arm are disengaged, when the actuator is operated to move the trailing arm from the raised transport position to the lowered operating position.

In a second embodiment the present invention provides agricultural seeding implement apparatus comprising an implement frame mounted on wheels for movement along the ground in an operating travel direction. A plurality of trailing arms are pivotally attached at front ends thereof to the frame about arm pivot axes oriented substantially horizontally and perpendicular to the operating travel direction, and the trailing arms extend rearward from the front ends thereof. A packer wheel is rotatably attached to a rear end of each trailing arm, and a furrow opener is attached to each trailing arm forward of the packer wheel. For each trailing arm, an actuator is operative to selectively move the trailing arm about the arm pivot axis from a lowered operating position to a raised transport position, and from the raised transport position to the lowered operating position. For each trailing arm, a latch mechanism is operative to engage the frame and the trailing arm when the trailing arm is moved to the transport position, such that the trailing arm is prevented from moving downward when the latch mechanism is in a latched position, and for each trailing arm, a release mechanism is operative to move the latch mechanism to an unlatched position, where the frame and trailing arm are disengaged, when the actuator is operated to move the trailing arm from the raised transport position to the lowered operating position.

The present invention thus will retain the individual trailing arms, and furrow openers attached thereto in the transport position in the event of a hydraulic cylinder leak.

Typically, gradual release of the retaining pressure from the hydraulic cylinder actuator will allow the opener to lower to the ground. The weight of the trailing arm and opener exerts a pressure on the actuator seals, promoting possible seal bypass or hydraulic leakage. With the present invention, the opener is prevented from dropping to the ground by way of a leaking cylinder, and as well pressure on the seals is relieved, such that the seals essentially perform a much reduced or no function during transport, and thus wear on the seals, and maintenance costs for replacement thereof, is reduced.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
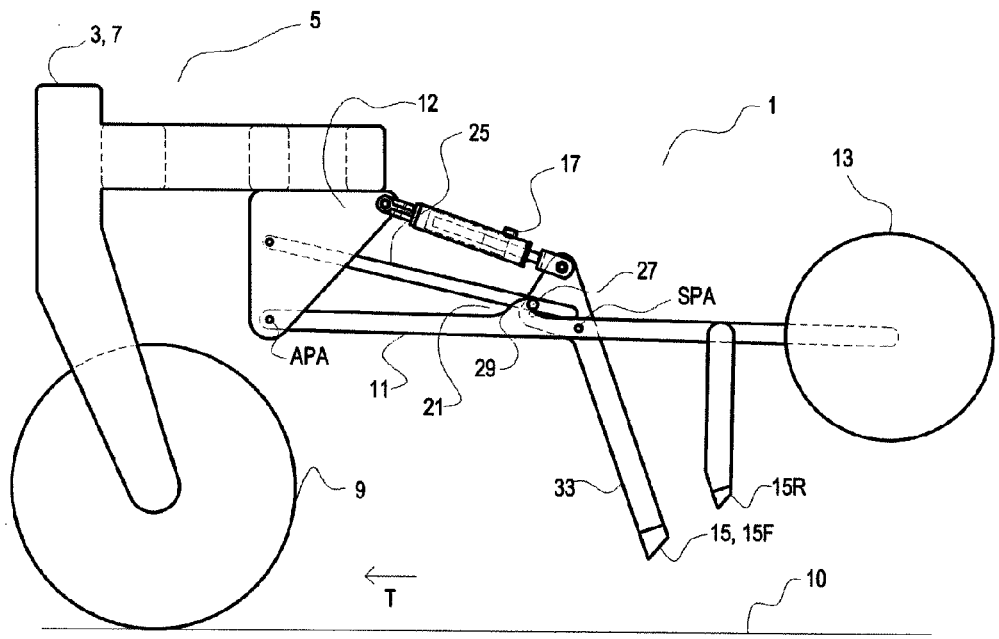
FIG. 1 is a schematic side view of an embodiment of a furrow opener apparatus of the present invention in the raised transport position; a seeding implement to which the furrow opener apparatus is attached is schematically indicated as well.

FIGS. 1-4 schematically illustrate a side view of a furrow opener apparatus 1 adapted for attachment to a frame 3 of an agricultural seeding implement 5. The frame 3 comprises frame members 7 arranged across the width and length of the implement, and is mounted on wheels 9 for movement along the ground in an operating travel direction T. The implement 5 will typically have a hitch at the front end thereof for attachment to a towing vehicle, and a plurality of furrow opener apparatuses 1 will be mounted to the frame 3 across a width of the implement 5.

The apparatus 1 comprises a trailing arm 11 adapted to be pivotally attached at a front end thereof to a frame member 7 about an arm pivot axis APA oriented substantially horizontally and perpendicular to the operating travel direction T. In the illustrated embodiment the trailing arm 11 is pivotally attached to a bracket 12 that is fixed to the frame member 7.

The trailing arm 11 extends rearward from the front end thereof, and a packer wheel 13 is rotatably attached to a rear end of the trailing arm 11. A furrow opener 15 is attached to the trailing arm 11 forward of the packer wheel 13. In the illustrated apparatus 1, there are two furrow openers 15F, 15R forward of the packer wheel 13. As is known in the art, either one or two furrow openers are typically mounted on a furrow opener apparatus of the type illustrated.

An actuator 17 is illustrated as a hydraulic cylinder as is typically the case. The hydraulic cylinder raises and lowers the trailing arm 11, and also exerts a downward bias force on the trailing arm. The actuator is pivotally attached to the bracket 12 at the front end and to the trailing arm 11 at the opposite rear end thereof. The actuator 17 is operative when extending and retracting to selectively move the trailing arm 11 about the arm pivot axis APA from a raised transport position illustrated in FIG. 1 where the furrow openers 15 are above the ground 10 to a lowered operating position illustrated in FIG. 3 where the furrow openers 15 are engaged in the ground 10, and then from the lowered operating position of FIG. 3 to the raised transport position of FIG. 1.

A latch mechanism 21 is operative to engage the frame member 7 and the trailing arm 11 when the trailing arm 11 is moved to the transport position of FIG. 1, such that the trailing arm 11 is prevented from moving downward when the latch mechanism 21 is in a latched position as illustrated in FIG. 1.

Figure 2:
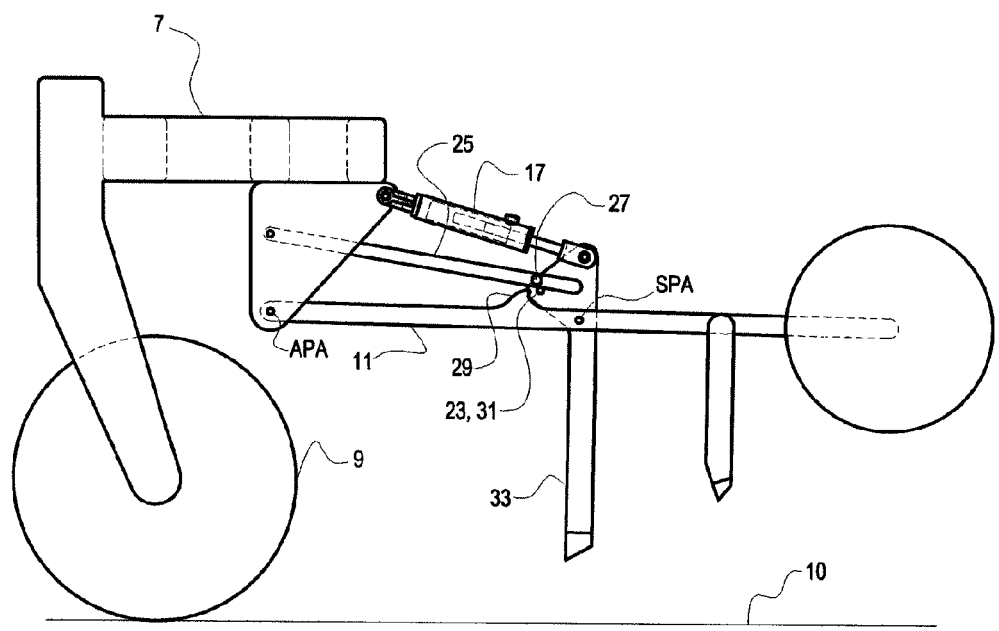
FIG. 2 is a schematic side view of the embodiment of FIG. 1 in an unlatched transport position where the latch mechanism is disengaged.
Figure 3:
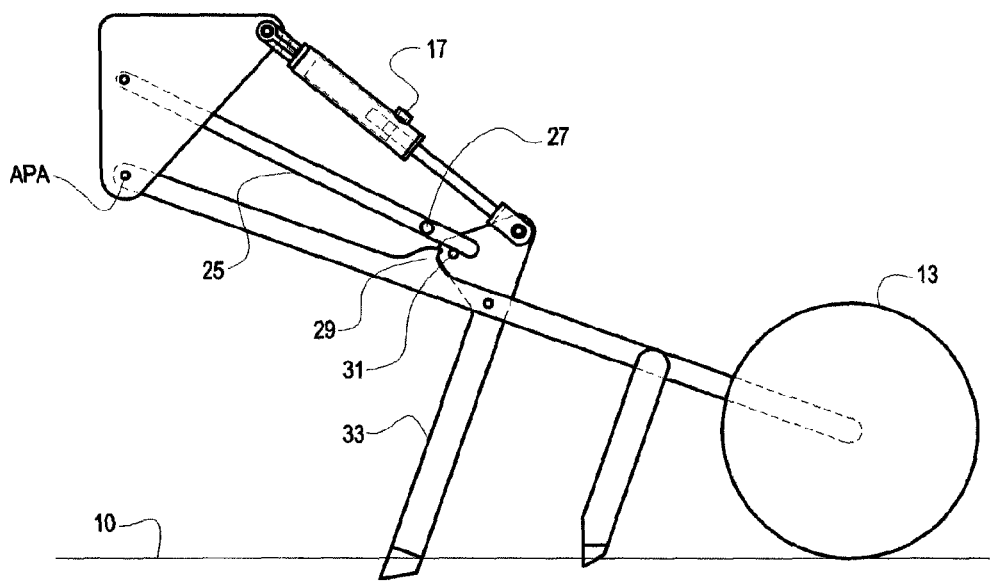
FIG. 3 is a schematic side view of the embodiment of FIG. 1 in an operating position.

A release mechanism 23 is operative to move the latch mechanism 21 to an unlatched position, illustrated in FIG. 2, where the frame member 7 and trailing arm are disengaged, when the actuator 17 is operated to move the trailing arm from the raised transport position to the lowered operating position.

In the illustrated apparatus 1 the latch mechanism 21 comprises a transport arm 25 pivotally attached at a front end thereof to a frame member of the implement, and extending rearward. The illustrated transport arm 25 is pivotally attached to the bracket 12. The trailing arm 11, actuator 17, and transport arm 25 are all thus pivotally connected to the frame 7 of the implement 5 by the bracket 12. Thus the whole furrow opener apparatus 1 can be assembled onto the bracket 12, and then the bracket 12 can be conveniently attached to a frame member 7 of the frame 3. It is contemplated that the trailing arm 11, actuator 17, and transport arm 25 could be otherwise attached to the same frame member 3, or to different frame members of the frame.

When the latch mechanism 21 is in the latched position, the transport arm 25 engages the trailing arm 11 such that the trailing arm 11 is prevented from moving downward. A latch pin 27 extends laterally from a rear portion of the transport arm 25, and a catch 29 is fixed to the trailing arm 11. The latch pin 27 and catch 29 are configured such that when the trailing arm 11 moves up to the transport position, the pin 27 engages the catch 29. In the illustrated apparatus 1, the catch 29 comprises a hook as shown with a rearward facing opening configured to engage the latch pin 27.

The illustrated release mechanism 23 comprises a release pin 31 configured such that when the actuator 17 is operated to move the trailing arm 11 from the raised transport position to the lowered operating position, the release pin 31 lifts the latch pin 27 out of engagement with the catch 29.

The front furrow opener 15F is mounted on a bottom end of a furrow opener shank 33 that is pivotally attached to the trailing arm 11 about a shank pivot axis SPA oriented substantially parallel to the arm pivot axis APA. The actuator 17 is connected to the furrow opener shank 33 such that the furrow opener shank 33 pivots about the shank pivot axis SPA when the actuator 17 moves the trailing arm 11 between the operating and transport positions.

The release pin 31 extends laterally from the furrow opener shank 33 and moves into contact with the transport arm 25 when the actuator 17 is operated to move the trailing arm 11 from the raised transport position to the lowered operating position. As can be seen in FIGS. 1-4, the actuator 17 is attached to the furrow opener shank 33 above the shank pivot axis SPA such that the actuator 17 extends to move the trailing arm 11 from the transport position to the operating position. As the actuator 17 extends, the furrow opener shank 33 pivots with respect to the trailing arm and latch pin 27 which is engaged in the catch 29. The release pin 31 extending from the shank 33 pivots upward and contacts the transport arm 25 and moves the transport arm 25 and the latch pin 27 attached thereto upward and out of engagement with the catch 29.

The apparatus 1 is configured such that the latch pin 27 is located rearward of the catch 29 when the trailing arm 11 is in the transport position and the pin 27 is engaged in the catch 29. The geometry is such that when the trailing arm 11 moves down to the operating position of FIG. 3, the latch pin 27 is located forward of the catch 29 and thus will not engage the catch 29.

Figure 4:
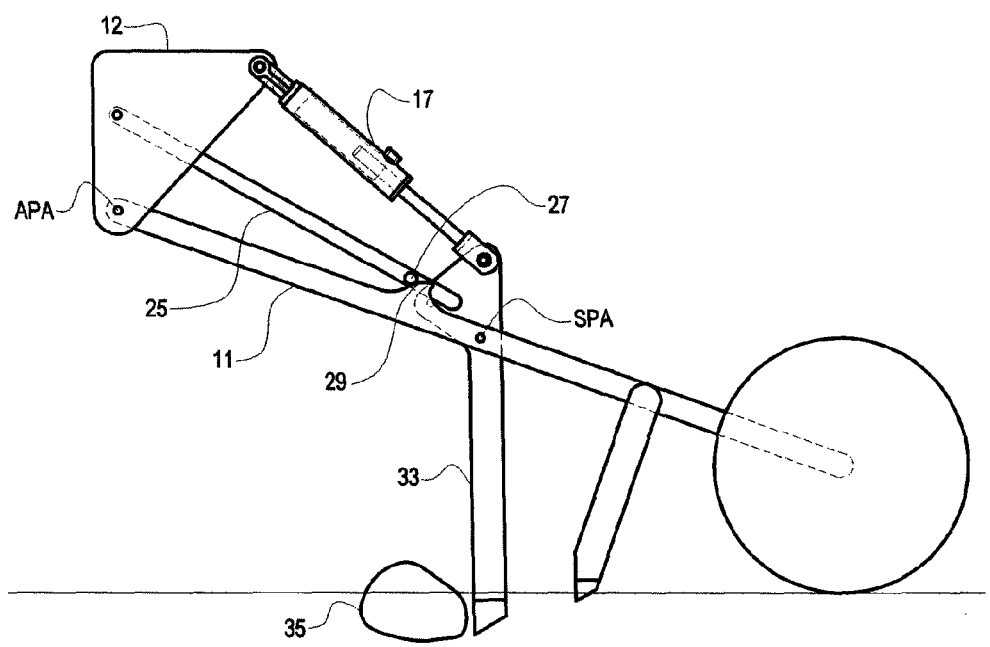
FIG. 4 is a schematic side view of the embodiment of FIG. 1 in a tripped operating position.
Figure 5:
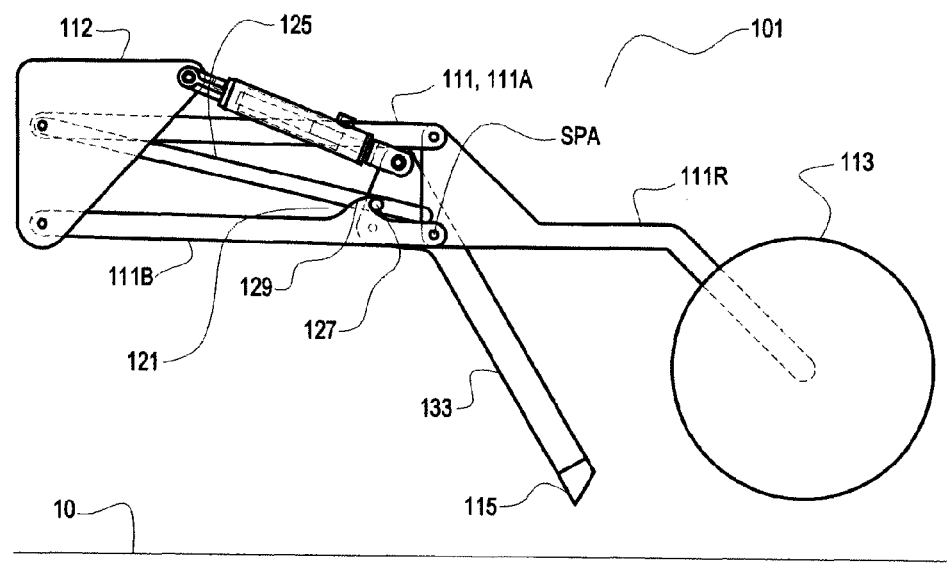
FIG. 5 is a schematic side view of an alternate embodiment of a furrow opener apparatus of the present invention where the trailing arm comprises a parallel linkage; the apparatus is shown in the raised transport position.
Figure 6:
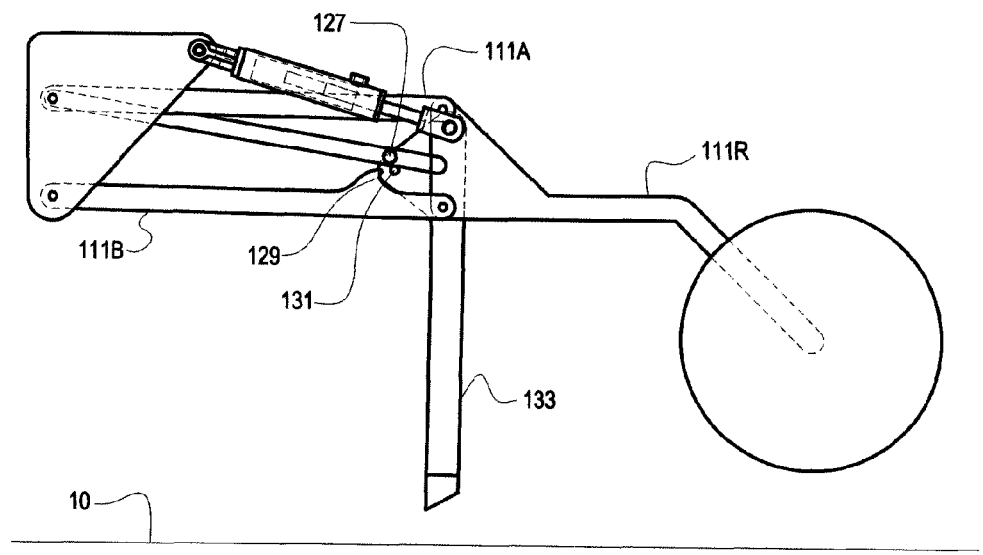
FIG. 6 is a schematic side view of the embodiment of FIG. 5 in an unlatched transport position where the latch mechanism is disengaged.
Figure 7:
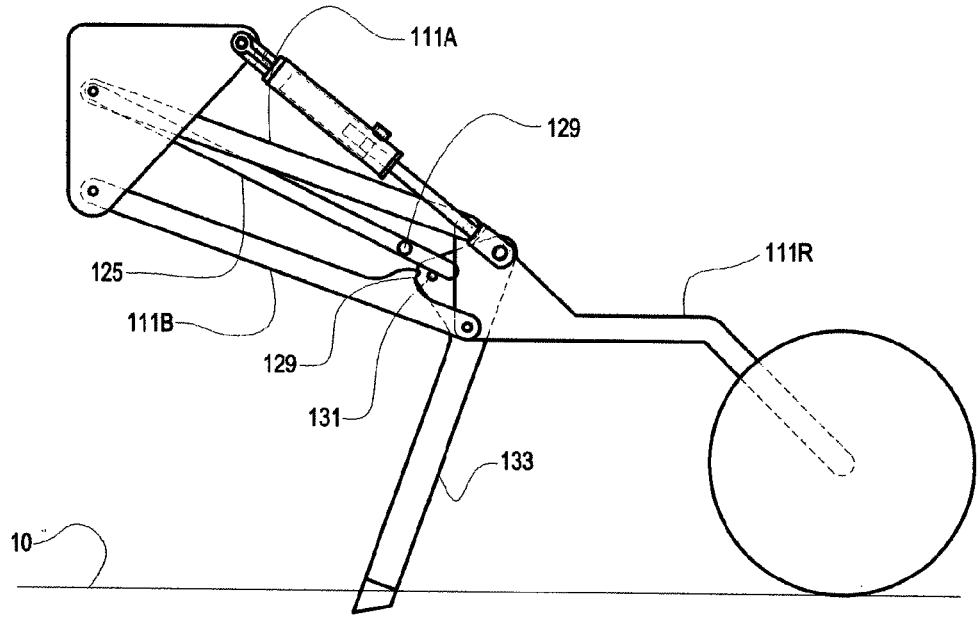
FIG. 7 is a schematic side view of the embodiment of FIG. 5 in an operating position.
Figure 8:
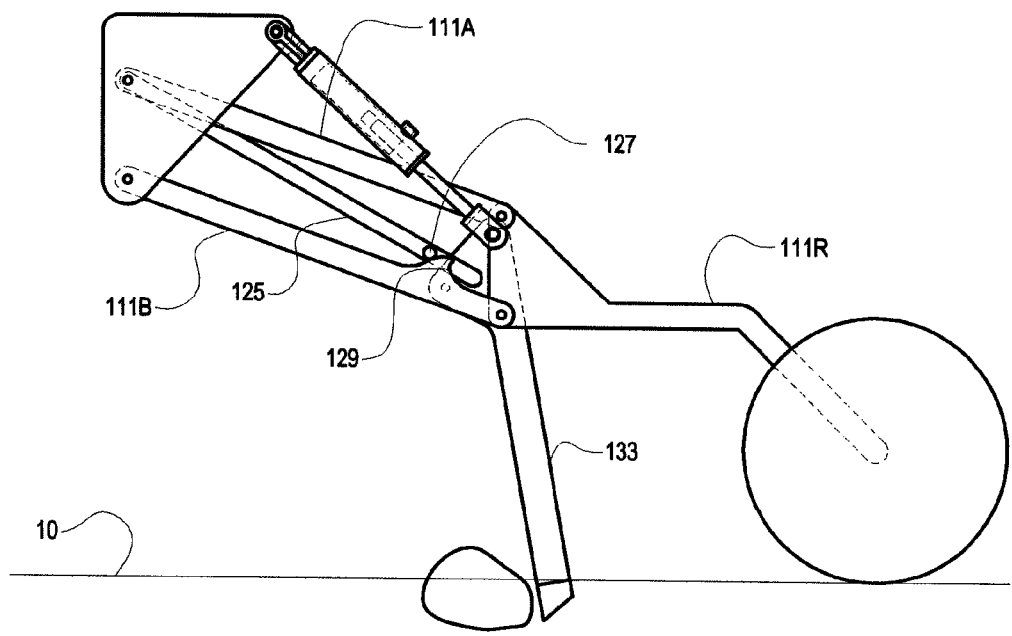
FIG. 8 is a schematic side view of the embodiment of FIG. 5 in a tripped operating position.

FIG. 4 illustrates the apparatus 1 in a tripped orientation. Contact of the front furrow opener 15F with an solid obstruction, such as the rock 35, will push the bottom end of the shank 33 rearward, pivoting about the shank pivot axis SPA, and force the actuator 17 to retract. Hydraulic pressure in the hydraulic cylinder actuator 17 is selected to allow this movement and prevent damage when the force on the shank 33 is excessive. As the shank 33 moves to the tripped position, the transport arm 25 drops and the latch pin 27 may drop down onto the trailing arm 11, but it is located forward of the hook of the catch 29, so that the latch pin 27 simply rides on the top of the trailing arm 11 and does not interfere with movement of the trailing arm 11 or shank 33.

FIGS. 5-8 illustrate an alternate apparatus 101 where the trailing arm 111 comprises a parallel link with upper and lower link arms 111A, 111B attached at front ends thereof to bracket 112 and attached at rear ends thereof to rear trailing arm portion 111R. The latch mechanism 121 is operative to engage the trailing arm 111 by engaging the lower link arm 111B. The catch 129 is located on the lower link arm 111B, and the catch pin 127 again extends laterally from the transport arm 125. Release pin 131 is mounted on the shank 133 above the shank pivot axis SPA It is contemplated that alternatively the mechanism could be configured so that the latch mechanism engaged the upper link 111A or the rear trailing arm portion 111R.

The apparatus 101 also includes only a single furrow opener 115 mounted on a shank 133 forward of the packer wheel 113. The apparatus 101 operates in substantially the same manner as the apparatus 1 described above as the apparatus 101 moves from the raised transport position of FIG. 5 where the furrow opener 115 are above the ground 10, through the unlatched position of FIG. 6 to the operating position of FIG. 7, and when required, to the tripped position of FIG. 8.

Figure 9:
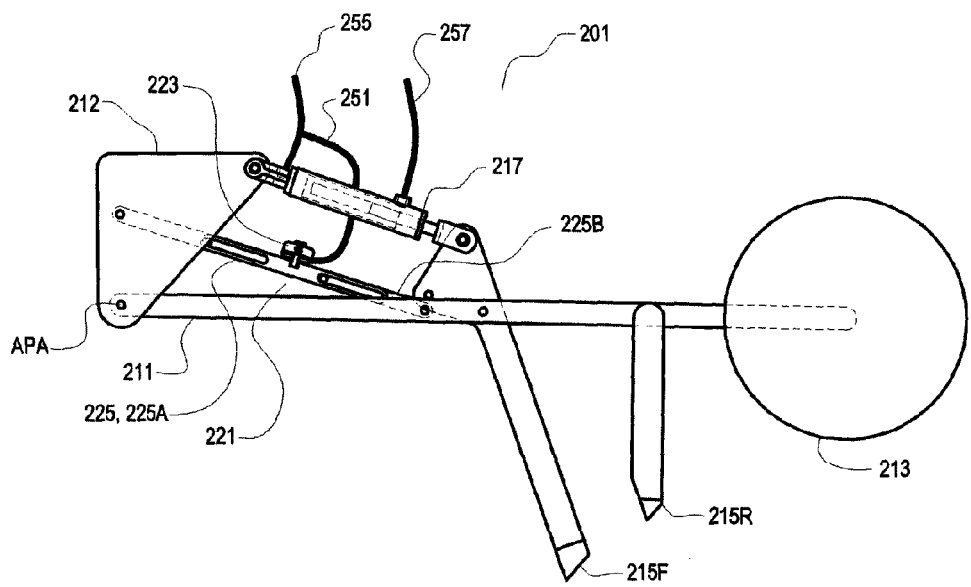
FIG. 9 is a schematic side view of a further alternate embodiment of a furrow opener apparatus of the present invention in the raised transport position.
Figure 10:
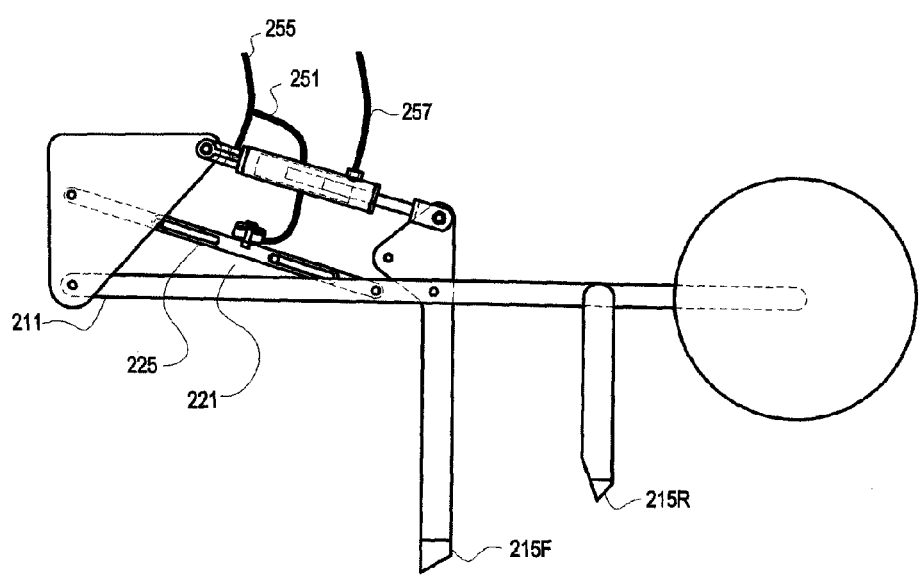
FIG. 10 is a schematic side view of the embodiment of FIG. 9 in an unlatched transport position where the latch mechanism is disengaged.
Figure 11:
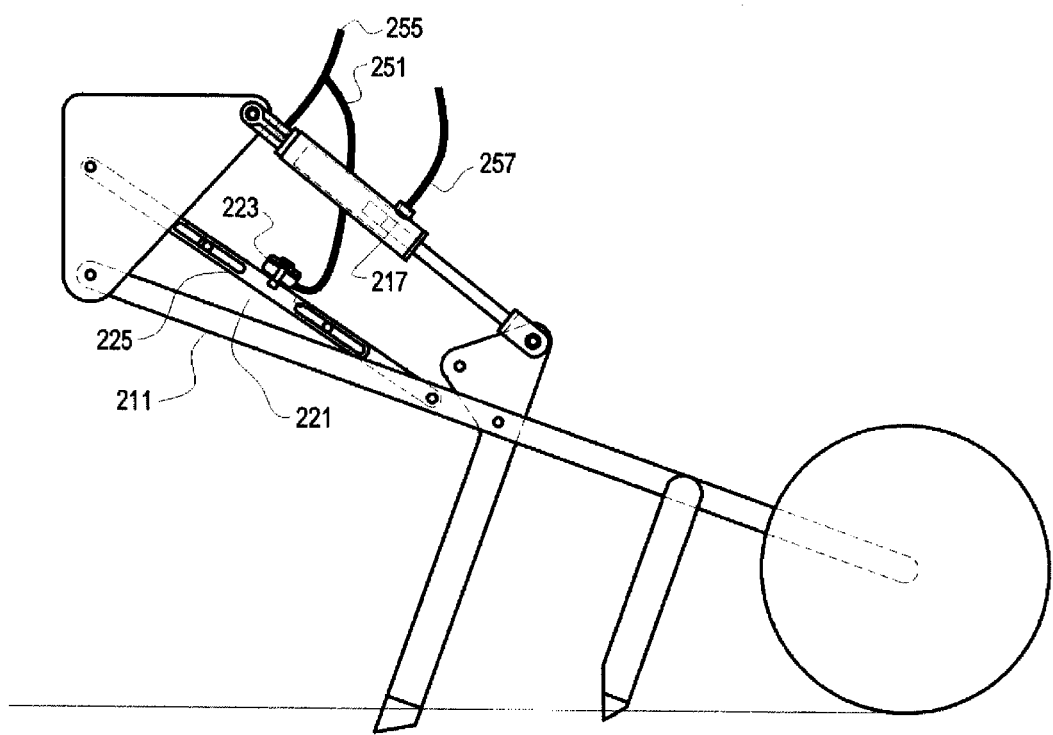
FIG. 11 is a schematic side view of the embodiment of FIG. 9 in an operating position.

FIGS. 9-11 illustrates a further alternate apparatus 201 with a trailing arm 211 pivotally attached at a front end thereof about an arm pivot axis, and with a packer wheel 213 rotatably attached to a rear end of the trailing arm 211. Front and rear furrow openers 215F, 215R are attached to the trailing arm 211 forward of the packer wheel 213. The actuator 217 is pivotally attached to the trailing arm 211 at the rear end thereof, and is operative when extending and retracting to selectively move the trailing arm 211 about the arm pivot axis APA from a raised transport position illustrated in FIG. 9 where the furrow openers 215 are above the ground 10 to a lowered operating position illustrated in FIG. 11 where the furrow openers 215 are engaged in the ground 10, and then from the lowered operating position of FIG. 11 to the raised transport position of FIG. 9.

An alternate latch mechanism 221 is operative to engage the frame of the implement to which the apparatus 201 is attached via bracket 212, and the trailing arm 211 when the trailing arm 211 is moved to the transport position of FIG. 9, such that the trailing arm 211 is prevented from moving downward.

Figure 12:
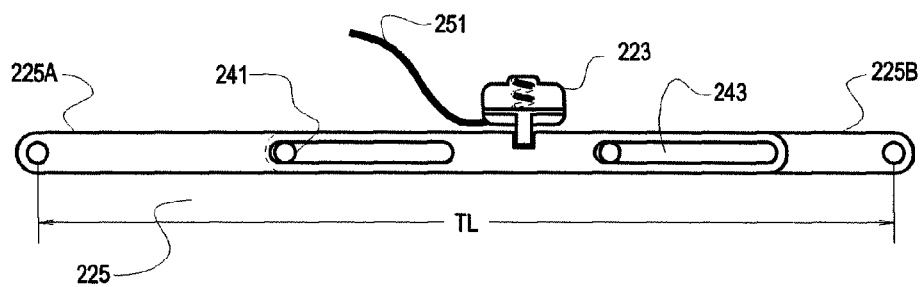
FIG. 12 is a side view of the transport arm of the embodiment of FIG. 9 shown in a latched position with a fixed length TL.
Figure 13:
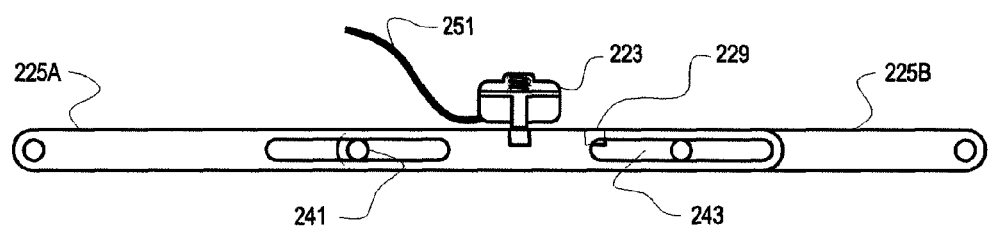
FIG. 13 is a side view of the transport arm of the embodiment of FIG. 9 shown in an unlatched position with a length that can vary so that the arm can extend and retract.

The latch mechanism 221 also comprises a transport arm 225, however in this apparatus 201, the transport arm 225 comprises front and rear portions 225A, 225B movable with respect to each other as illustrated in FIGS. 12 and 13. The front portion 225A is pivotally attached at a front end thereof to the frame member via the bracket 212, and the rear portion 225B is pivotally attached to the trailing arm 211. When the latch mechanism 221 is in the latched position of FIG. 9, the front and rear portions 225A, 225B are engaged such that the transport arm 225 is maintained at a transport length, as illustrated in FIG. 12, that prevents the trailing arm 211 from moving downward.

In the illustrated apparatus 201, arm pins 241 in the front portion 225A of the transport arm 225 engage slots 243 in the rear portion 225B of the transport arm such that the front and rear portions slide longitudinally with respect to each other to allow the transport arm to extend and retract to allow the trailing arm to move up and down during field operations when in the operating position of FIG. 11, and also allowing the furrow opener to trip if it encounters an obstruction. The front and rear portions 225A, 225B could also telescope or otherwise be arranged to move with respect to each other in a suitable fashion.

When the actuator 217 retracts to move the trailing arm 211 up from the operating position of FIG. 11 to the transport position of FIG. 9, the transport arm 225 retracts as well. When the transport arm reaches the transport length TL, a latch pin 227 mounted on the front portion 225A of the transport arm is aligned with an aperture 229 in the rear portion 225B of the transport arm. The illustrated latch pin 227 is on top of the transport arm 225 and is biased downward such that when the aperture 229 moves into alignment, the latch pin 227 is pushed into the aperture 229, and latches the trailing arm in the raised transport position.

Figure 14:
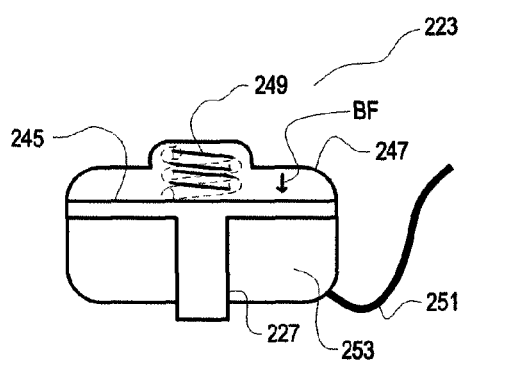
FIG. 14 is a schematic view of the release mechanism of the embodiment of FIG. 9, shown in a released position with the latch pin retracted and substantially inside the cylinder.
Figure 15:
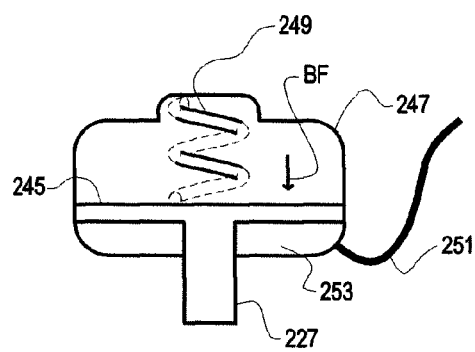
FIG. 15 is a schematic view of the release mechanism of the embodiment of FIG. 9, shown in a latched position with the latch pin extending out of the cylinder.

An example of a suitable release mechanism 223 is illustrated in FIGS. 14 and 15. A piston 245 is slidably contained in a release cylinder 247 and the periphery of the piston 245 is sealed to the inner walls of the cylinder 247. A bias element, illustrated as spring 249, is located in the cylinder 247 above the piston 245 and exerts a downward bias force BF on the piston 245, and the latch pin 227 extends from the piston 245 downward out of the cylinder 247 through a sealed aperture. Thus the bias force constantly urges the latch pin down ward.

A latch conduit 251 for conducting pressurized hydraulic fluid is connected to the inside of the cylinder 247 below the piston 245. When there is no pressure in the latch conduit 251, the spring 249 forces the piston down and pushes hydraulic fluid 253 below the piston out through the latch conduit 251.

The actuator 217 is provided by a hydraulic cylinder connected to a pressurized hydraulic fluid source at a down port 255 and an up port 257. The latch conduit 251 is connected to the down port 255. When a hydraulic control is operated to move the actuator 217 to raise the trailing arm 211 to the transport position, pressurized hydraulic fluid is directed into the up port 257, and there is substantially no pressure in the down port 255, so that the actuator 217 and transport arm 225 retract and the trailing arm 211 moves up. There is also no pressure in the latch conduit 251, and so when the aperture 229 and latch pin 227 move into alignment, the piston 245 and attached latch pin 227 move downward in response to the bias force BF and the latch pin moves into the aperture to latch the trailing arm in the transport position.

When the hydraulic control is operated to move the actuator 217 to lower the trailing arm 211 to the operating position, pressurized hydraulic fluid is directed into the down port 255, and there is substantially no pressure in the up port 257, so that the actuator 217 extends. There is also pressure in the latch conduit 251, and pressurized hydraulic fluid 253 is forced into the cylinder 247 below the piston 245 and exerts an upward release force on the piston which is greater than the bias force BF, and so the piston 245 is forced upward and the latch pin 227 moves upward out of the aperture 229, allowing the actuator 217 and transport arm 225 to extend and move the trailing arm 211 down through the intermediate position of FIG. 10 to the operating position of FIG. 11.

Figure 16:
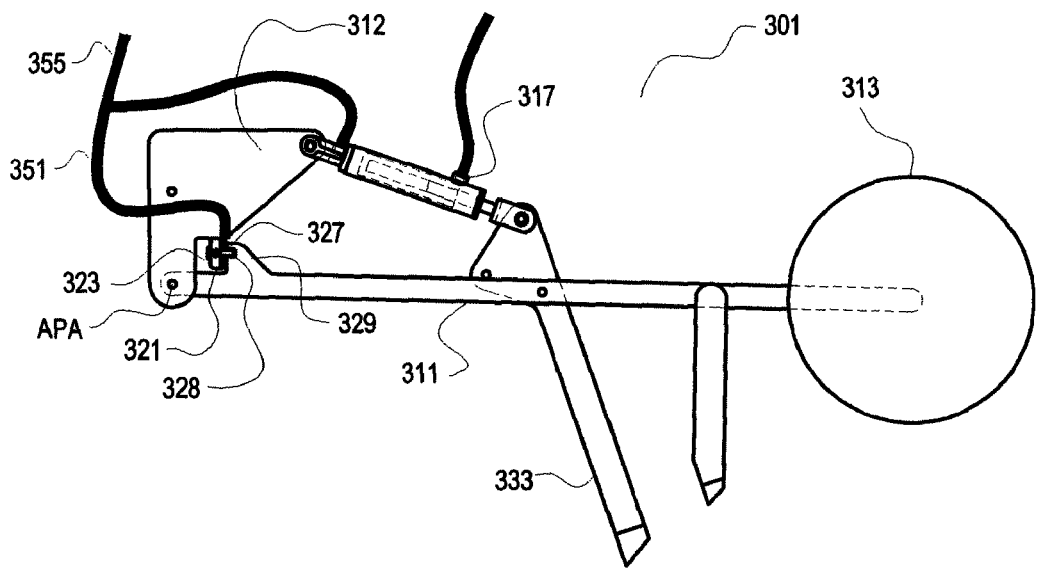
FIG. 16 is a schematic view of a further alternate embodiment of a furrow opener apparatus of the present invention in the raised transport position where the latch mechanism locks the position of the opener arm directly.
Figure 17:
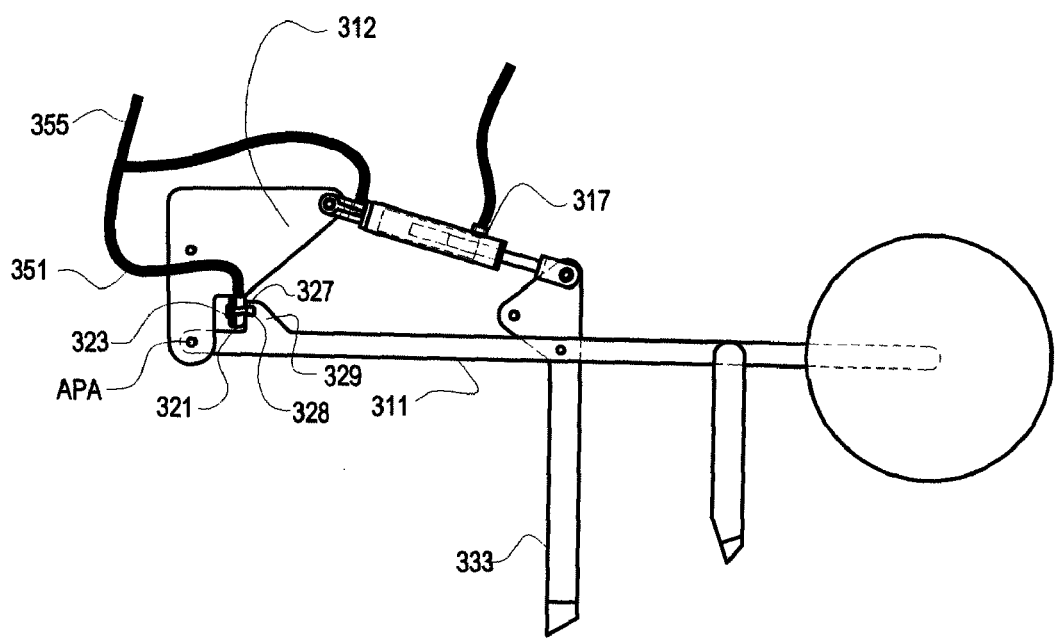
FIG. 17 is a schematic side view of the embodiment of FIG. 16 in an unlatched transport position where the latch mechanism is disengaged.
Figure 18:
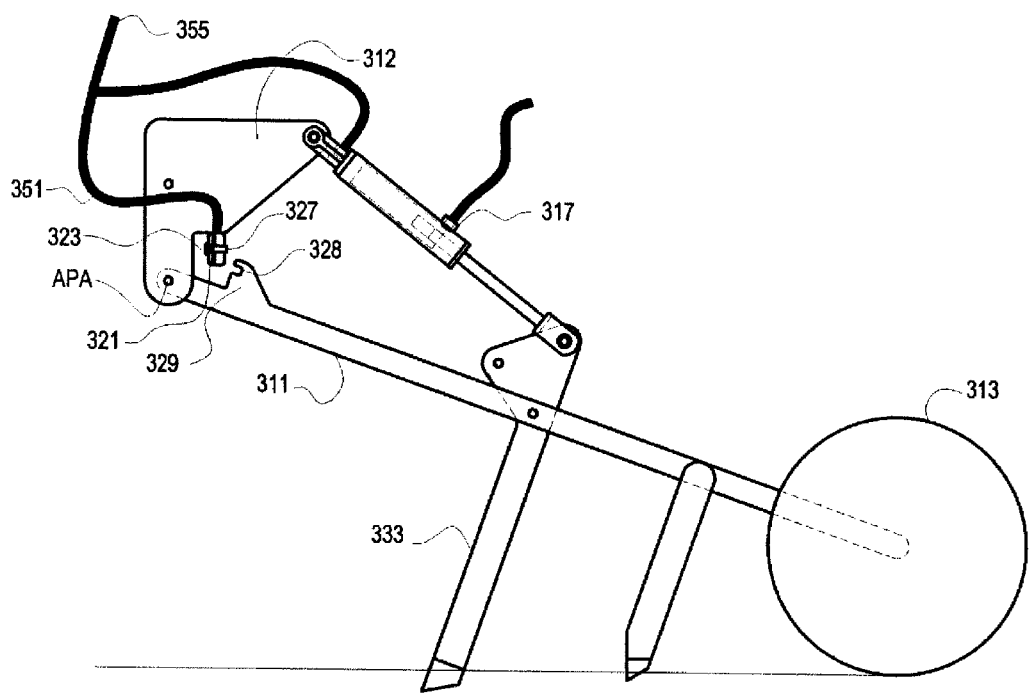
FIG. 18 is a schematic side view of the embodiment of FIG. 16 in an operating position.

FIGS. 16-18 schematically illustrate a further alternate furrow opener apparatus 301. In this design, the intermediate lock arm is not required and the latch mechanism 321 locks the position of the opener arm 311 directly. A trailing arm 311 is pivotally attached at a front end thereof about an arm pivot axis APA, and a packer wheel 313 is rotatably attached to a rear end of the trailing arm 311 and furrow opener shanks 333 are mounted on the trailing arm 311. The actuator 317 is operative when extending and retracting to selectively move the trailing arm 311 about the arm pivot axis APA from a raised transport position illustrated in FIG. 16 to a lowered operating position illustrated in FIG. 18 and back again.

The latch mechanism 321 comprises a catch member 329 fixed to the trailing arm 311 and a latch pin assembly fixed to the implement frame via bracket 312. In the latch pin assembly a latch pin 327 is attached to the piston of a release mechanism 323 similar to that of FIGS. 14 and 15, and is biased outward such that when the trailing arm 311 is moved to the transport position of FIG. 16, the aperture 328 in the catch member 329 aligns with the biased latch pin 327 and the latch pin 327 enters the aperture 328 such that the trailing arm 311 is prevented from moving downward.

When the hydraulic control is operated to move the actuator 317 to lower the trailing arm 311 to the operating position, pressurized hydraulic fluid is directed into the down conduit 355 and the latch conduit 351, and pressurized hydraulic fluid is forced into the release mc 323 and overcomes the bias force and moves the latch pin 327 out of the aperture 328 to the unlatched position of FIG. 17, allowing the actuator 317 to extend and move the trailing arm 311 down to the operating position of FIG. 18.

In the illustrated furrow opener apparatuses 1, 101, 201, 301, the furrow opener shank is pivotally attached to the trailing arm of the apparatus, however those skilled in the art will recognize that the latch mechanism 221 and release mechanism 223 of the apparatus 201, and the latch mechanism 321 and release mechanism 323 of the apparatus 301 would work equally well where the shank was fixed with respect to the trailing arm.

The present invention thus latches the trailing arms in the transport position, preventing the trailing arms from moving down out of the transport position and causing damage to the apparatus, and as well pressure on the seals is relieved, reducing maintenance costs.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A furrow opener apparatus adapted for attachment to a frame member of an agricultural seeding implement, the apparatus comprising:
a trailing arm adapted to be pivotally attached at a front end thereof to the frame member about an arm pivot axis oriented substantially horizontally and perpendicular to an operating travel direction of the implement, and the trailing arm extending rearward from the front end thereof;
a packer wheel rotatably attached to a rear end of the trailing arm, and a furrow opener attached to the trailing arm forward of the packer wheel;
an actuator provided by an extendable hydraulic cylinder, the actuator operative to selectively move the trailing arm about the arm pivot axis from a lowered operating position to a raised transport position, and from the raised transport position to the lowered operating position;
a latch mechanism operative to engage the frame member and the trailing arm when the trailing arm is moved to the transport position, such that the trailing arm is prevented from moving downward if the hydraulic cylinder leaks when the latch mechanism is in a latched position; and
a release mechanism operative to move the latch mechanism to an unlatched position, where the frame member and trailing arm are disengaged, when the actuator is operated to move the trailing arm from the raised transport position to the lowered operating position.

2. The apparatus of claim 1 wherein the latch mechanism comprises a transport arm adapted to be pivotally attached at a front end thereof to a frame member of the implement, and extending rearward, and wherein when the latch mechanism is in the latched position, the transport arm engages the trailing arm such that the trailing arm is prevented from moving downward.

3. The apparatus of claim 2 comprising a latch pin extending laterally from a rear portion of the transport arm, and a catch fixed to the trailing arm, and wherein the latch pin and catch are configured such that when the trailing arm moves up to the transport position, the latch pin engages the catch.

4. The apparatus of claim 3 wherein the release mechanism comprises a release pin configured such that when the actuator is operated to move the trailing arm from the raised transport position to the lowered operating position, the release pin lifts the latch pin out of engagement with the catch.

5. The apparatus of claim 4 wherein the furrow opener is mounted on a bottom end of a furrow opener shank that is pivotally attached to the trailing arm about a shank pivot axis oriented substantially parallel to the arm pivot axis, and wherein the actuator is connected to the furrow opener shank such that the furrow opener shank pivots about the shank pivot axis when the actuator moves the trailing arm between the operating and transport positions.

6. The apparatus of claim 5 wherein the release pin extends laterally from the furrow opener shank and moves into contact with the transport arm when the actuator is operated to move the trailing arm from the raised transport position to the lowered operating position.

7. The apparatus of claim 3 wherein the latch pin is located rearward of the catch when the trailing arm is in the transport position and the latch pin is engaged in the catch, and wherein the latch pin is located forward of the catch when the trailing arm is in the operating position.

8. The apparatus of claim 3 wherein the catch comprises a hook with an opening configured to engage the latch pin, and wherein the opening faces rearward.

9. The apparatus of claim 2 wherein the transport arm comprises front and rear portions movable with respect to each other, and wherein the front portion is adapted to be pivotally attached at a front end thereof to the frame member, and the rear portion is pivotally attached to the trailing arm, and wherein when the latch mechanism is in the latched position the front and rear portions are engaged such that the transport arm is maintained at a transport length that prevents the trailing arm from moving downward.

10. The apparatus of claim 9 wherein arm pins in one of the front and rear portions of the transport arm engage slots in the other of the front and rear portions of the transport arm, and wherein a latch pin mounted on one of the front and rear portions of the transport arm is configured to enter an aperture in the other of the front and rear portions of the transport arm.

11. The apparatus of claim 10 wherein the latch pin is biased toward the aperture such that when the aperture and latch pin are aligned, a bias force pushes the latch pin into the aperture, and wherein when the actuator is operated to move the trailing arm from the raised transport position to the lowered operating position, a release force is exerted on the pin against the bias force to move the latch pin out of the aperture.

12. The apparatus of claim 11 wherein the actuator is provided by a hydraulic cylinder, and wherein when the actuator is operated to move the trailing arm from the raised transport position to the lowered operating position, pressurized hydraulic fluid is directed into a down port of the hydraulic cylinder, and into a release cylinder configured to exert the release force on the latch pin.

13. The apparatus of claim 1 wherein the latch mechanism comprises a catch member fixed to the trailing arm and a latch pin assembly adapted to be fixed to the frame member, and wherein the catch member engages the latch mechanism when the trailing arm is raised to the transport position such that the trailing arm is prevented from moving downward.

14. The apparatus of claim 13 wherein the actuator is provided by a hydraulic cylinder, and wherein when the actuator is operated to move the trailing arm from the raised transport position to the lowered operating position, pressurized hydraulic fluid is directed into a down port of the hydraulic cylinder, and into a release mechanism operative to move the latch mechanism to an unlatched position.

15. The apparatus of claim 1 wherein the trailing arm comprises a parallel link with upper and lower link arms, and wherein the latch mechanism is operative to engage the trailing arm by engaging one of the upper link arm, the lower link arm, and a portion of the trailing arm located rearward of the upper and lower link arms.

* * * * *